Aug. 13, 1957     D. ROUSE     2,802,512
METHOD AND MEANS FOR APPLICATION OF SIDEWALLS TO TIRES
Filed Dec. 10, 1954     2 Sheets-Sheet 1
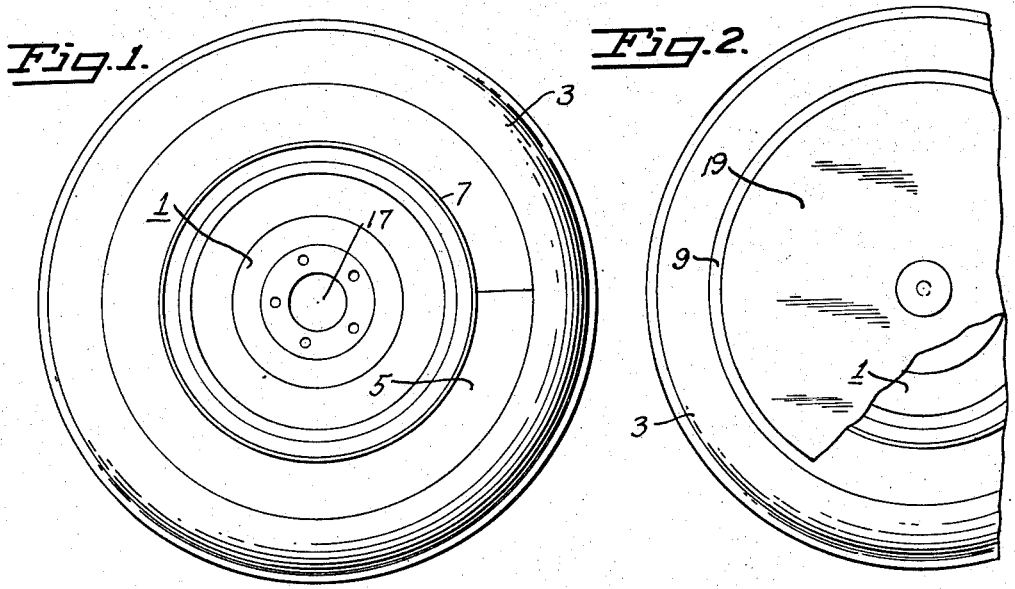
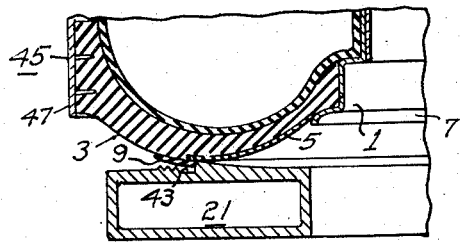
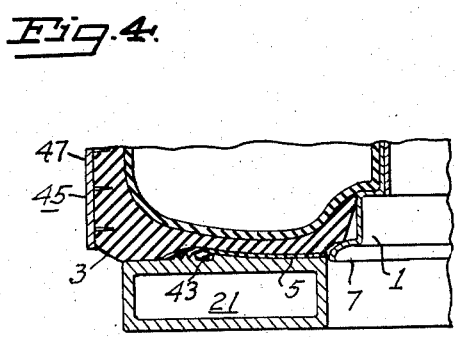
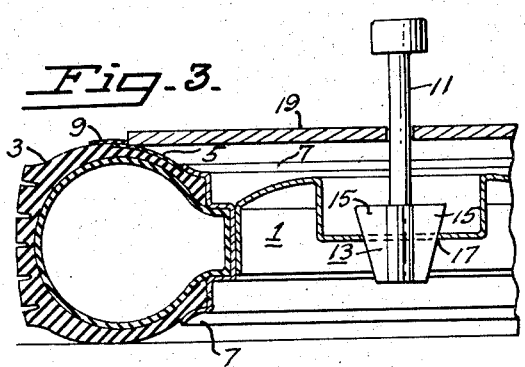
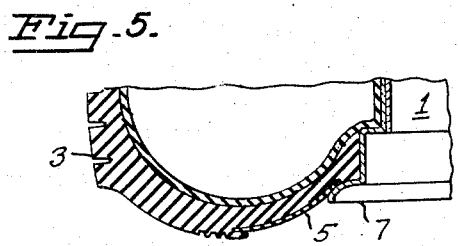
INVENTOR.
DAVID ROUSE
BY
HIS ATTORNEYS

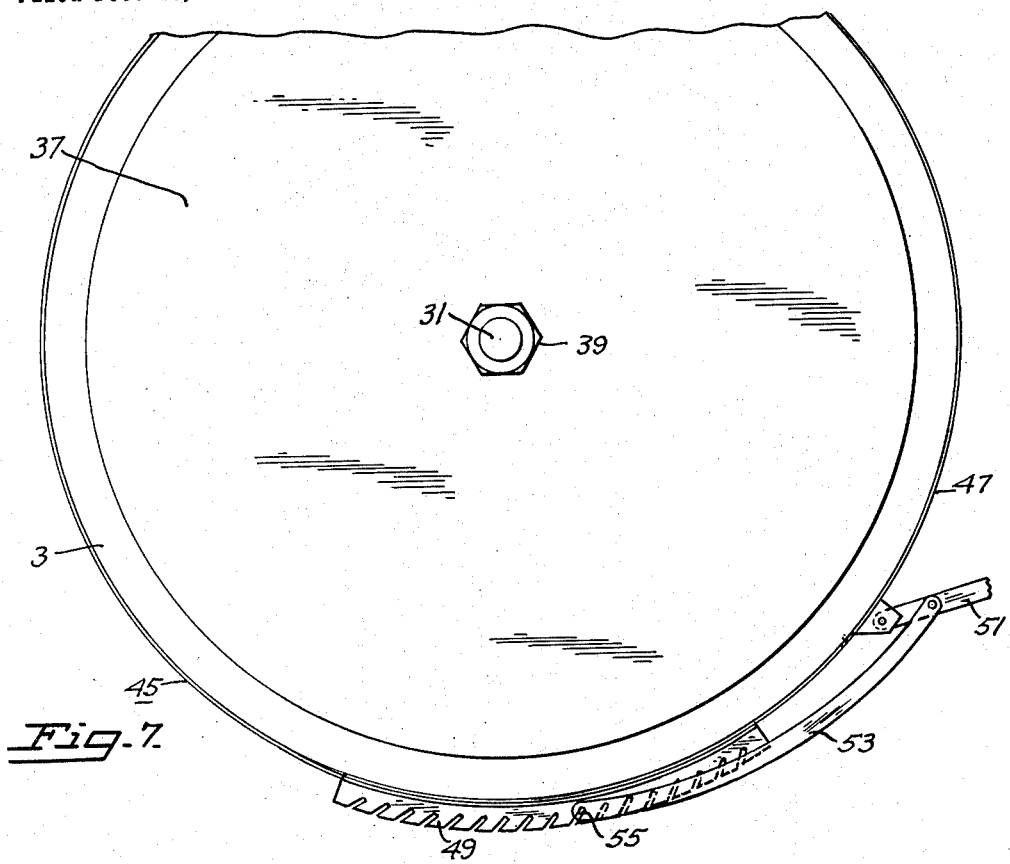
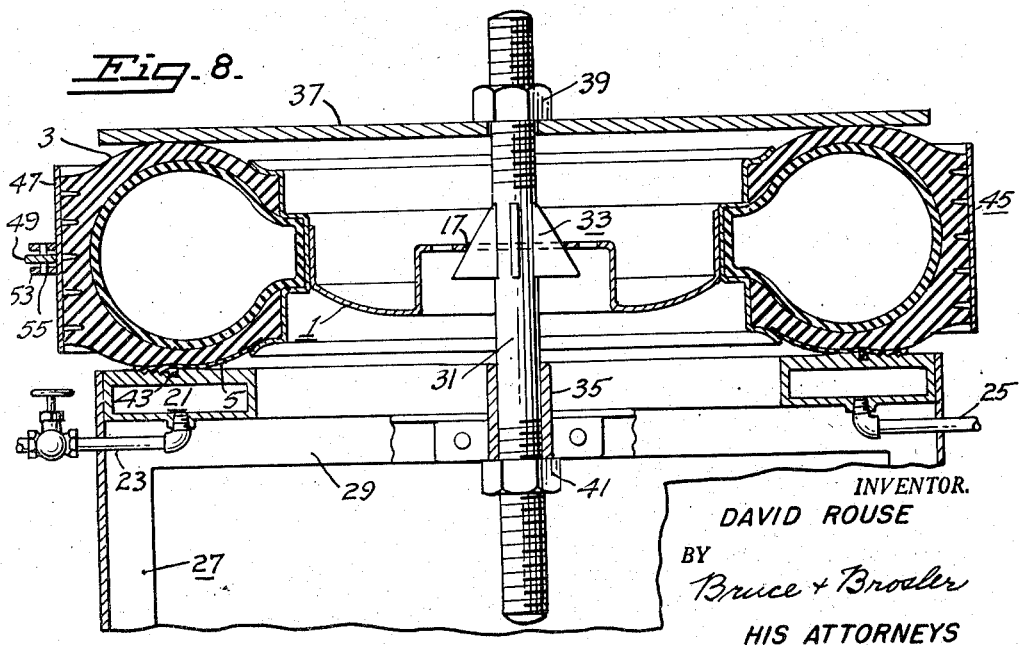

United States Patent Office 2,802,512
Patented Aug. 13, 1957

2,802,512

METHOD AND MEANS FOR APPLICATION OF SIDEWALLS TO TIRES

David Rouse, Oakland, Calif.

Application December 10, 1954, Serial No. 474,494

6 Claims. (Cl. 154—9)

My invention relates to method and means for application of sidewalls to tires, and more particularly in connection with the application of white sidewalls to conventional tires having original sidewalls of black rubber and a tread section joining the sidewalls.

Equipment is available for the application of sidewalls to automotive vehicle tires but such equipment requires the removal of a tire from its wheel before the equipment can be put to use. The labor factor thus necessarily involved in the removal of the tire and the subsequent installation back on to the wheel, has materially limited the market for the application of white sidewalls, despite the strong desire for white sidewall tires on the part of car owners.

Among the objects of the present invention are:

1. To provide a novel and improved method and means for the application of sidewalls to automobile tires and more particularly for applying white sidewalls to conventional tires having original sidewalls of black rubber.

2. To provide a novel and improved method and means for applying white sidewalls to wheel-mounted tires, and without the necessity of first removing such tires in applying the white sidewalls thereto; and 3. To provide a novel and improved method and means for applying white sidewalls to wheel-mounted tires, which will result in the white sidewalls extending down behind the rim edges of the wheel.

Additional objects of my invention will be brought out in the following description of a preferred embodiment of the same, taken in conjunction with the accompanying drawings, wherein Figures 1 through 6 are views depicting in sequence, the various steps involved in the application of sidewalls to wheel-mounted tires, in accordance with the teachings of the present invention.

Figures 7 and 8 are respectively, plan and sectional views of the equipment employed in the final stages of applying such sidewalls to the original sidewalls of the tire.

Referring to the drawings for details of my invention, the wheel 1 and mounted tire 3, as taken from the axle of the car, is supported in position, preferably on a horizontal supporting surface, with that wall of the tire exposed, on which the sidewall material is to be applied.

The sidewall area to be covered, is first coated with a suitable bonding cement, following which, a strip 5 of white sidewall rubber material is progressively laid upon the original sidewall of the tire, using the rim 7 of the wheel as a guide, until the starting end is reached, at which point the strip of material is severed, following which the applied strip is then smoothed down to adhesively secure the same to the tire wall throughout the contact area. The width of the strip of white sidewall material is preferably in excess of the white sidewall to be ultimately exposed.

Following this application of the strip of white sidewall material, I apply a bordering strip 9 of black rubber to the wall of the tire in overlapping relationship to the excess portion of the white sidewall material. To accurately and concentrically apply such bordering strip, I provide a guide means in the form of a stem 11 having at one end, an inverted centering cone 13 preferably formed of a plurality of substantially triangular vanes 15 radiating from the stem. The cone is adapted to enter the hub opening 17 of a wheel and engage the edge thereof, the slope of the centering cone being such as to permit the cone to accommodate itself to the various size hub openings to be found in wheels of different manufacture.

Over the free end of the stem 11 is positioned a guide disc 19 adapted to rest upon the previously applied sidewall material, the diameter of such guide disc being essentially the same as the outside diameter of the white sidewall when completed. Thus the disc, when properly centered, will leave exposed, the aforementioned excess portion of the white sidewall material. Accuracy in centering the guide disc may be assured by levelling the same, and adjusting the position thereof, as necessary, to realize a normal relationhsip between the stem and the disc.

With the disc properly centered, and utilizing the edge thereof as a guide, the strip of black rubber bordering material is then applied, and as a result will overlap the exposed portion of the white sidewall material. The presence of the bonding cement, as previously applied, will cause it to become adhesively secured to the tire in proper relationship to the white sidewall material.

The tire as thus prepared, and without demounting the same from the wheel, is placed with the prepared sidewall in contact with a suitable cooking mold 21. Such cooking mold is preferably of an annular shape, having an inside diameter just sufficient to permit it to clear the rim of the wheel on which the tire is mounted. It may be of the steam heated type, as illustrated, in which case, it will be provided with the steam intake pipe connection 23 at one point and an exhaust pipe connection 25 at a point diametrically opposite to the intake pipe connection.

The mold is preferably mounted in a horizontal plane, on a circular stand 27 incorporating a spider 29 on which the mold rests.

With the air pressure in the tire reduced to a low value, say of the order of 10 pounds or less, the tire is clamped to the mold. Such clamping means includes a stem 31 threaded at each end and having at an intermedite position thereon a centering cone 33 similar to the one previously described. One end of the stem is passed through the hub 35 of the spider, and the wheel positioned over the stem in the act of placing the tire upon the mold. Following the positioning of the tire, a clamping plate 37 is assembled over the stem and permitted to rest upon the tire. A clamping nut 39 applied to the stem against the clamping plate, will permit the centering cone to be drawn up into the hub opening of the wheel, to facilitate the accurate positioning of the tire on the mold, following which a similar clamping nut 41 applied to the other end of the stem, will permit of the tire to be securely clamped between the clamping plate and the mold.

With the tire thus securely clamped to the mold, the tire is inflated to a pressure value far beyond normal riding pressures; to a value for example of the order of 90 pounds per square inch, following which, steam is admitted to the mold at a suitable valcanizing temperature, say of the order of 320 degrees Fahrenheit, and the tire permitted to cook for a sufficient length of time, of the order of 20 minutes or so, to bring about vulcanization of both the white wall strip and the overlapping black rubber bordering strip, to each other and to the original sidewall of the tire.

Along that edge of the black rubber strip adjacent the white sidewall material, the mold is preferably formed with a recess 43, whereby upon completion of the vulcanizing step, a rib of black rubber will be formed, bordering the white wall. Such rib not only provides a clear and well defined line between the white sidewall and the rest of the tire, but also serves as a bumper rib to protect the tire against curb bruises and the like.

In carrying out the foregoing procedure, I can, and prefer to, encircle the tire with a protective peripheral band 45, which will protect the tire against the effects of the high pressure to which it is exposed during vulcanization. Such band is preferably in the form of an open ring 47 with toggle means for drawing the ends toward each other and then locking the band about the tire.

The toggle means involves a multiple notched strip 49 along one end of the split ring, a lever 51 pivotally secured at one of its ends to the other end of the open ring, and an arcuate link 53 of parallel spaced arcuate members, pivoted at one end to an intermediate point on the lever 51. At its other end, the arcuate members are connected by a spacer pin 55 adapted to mesh in a selected one of the many notches of the notched strip 49. The protective band is thus adaptable for application to tires of various sizes.

I have discovered when following the above method in applying sidewalls to existing tires, that upon removing the wheel and tire assembly from the vulcanizing equipment, the applied sidewall extends down behind the rim of the wheel to the bead of the tire, despite the fact that the tire has never been removed from the wheel at any time in the process. This is exceedingly desirable in determining the acceptability of the finished product by the purchasing public.

How the white sidewall material, which is fully exposed to view when applied to the tire, ultimately ends up extending down behind the rim of the wheel, has presented a problem in explanation. It is believed, however, that this accomplishment is made possible through the combined effect of clamping the tire to the mold and inflating the tire to the high order of pressure indicated. The mold, when in clamping engagement with the tire, would tend to tilt the bead on its toe and lift the heel of the bead as depicted in Figure 5. The inflation of the tire to high pressure would bulge the tire and tend to lift the bead and thus additionally expose to the mold, portions of the tire adjacent the bead and which are normally hidden behind the tire rim.

Consequently, when the conditions are restored to normalcy, the bead will return to its initial position within the rim of the tire and cause the inside edge of the white sidewall material to become masked by the wheel rim.

Accordingly, while I have disclosed in detail my preferred method and means for applying sidewalls to existing automobile tires, the same are subject to alteration and modification without departing from the basic principles involved, and I, therefore, do not desire to be limited in my protection to the specific details illustrated and described, except as may be necessitated by the appended claims.

I claim:

1. The method of applying a white sidewall to a wheel-mounted tire having original sidewalls and a tread section joining the sidewalls, and without removing the tire from the wheel, said method comprising adhesively securing a strip of white sidewall material to a wall of said tire using the rim edge of the wheel as a guide, applying a bordering strip of black rubber to the wall of said tire, clamping said tire, while at low pressure, to a heatable mold of annular shape having an inner diameter just sufficient to clear the rim of said wheel and raising the pressure in said tire, to expose to said mold, a portion of the tire wall previously hidden behind the edge of the wheel, heating said mold to a vulcanizing temperature for a period sufficient to vulcanize said strips to said tire wall and then reducing the tire presure and clamping pressure.

2. The method of applying a white sidewall to a wheel-mounted tire having original sidewalls and a tread section joining the sidewalls, and without removing the tire from the wheel, said method comprising adhesively securing a strip of white sidewall material to a wall of said tire, using the rim edge of the wheel as a guide, said strip having a width in excess of the white sidewall ultimately to be exposed, concentrically positioning on said wheel, a disc of a diameter such as to expose the excess width of said white sidewall strip, utilizing the rim of said disc as a guide, applying a bordering strip of black rubber to the wall of said tire in overlapping relationship to the exposed portion of said white sidewall strip, clamping said tire, while at low pressure, between a clamping plate and a heatable mold of annular shape having an inner diameter just sufficient to clear the rim of said wheel and raising the pressure in said tire, to expose to said mold, a portion of the tire wall previously hidden behind the edge of the wheel, heating said mold to a vulcanizing temperature for a period sufficient to vulcanize said strips to said tire wall and then reducing the tire pressure and clamping pressure.

3. The method of applying a white sidewall to a wheel-mounted tire having original sidewalls and a tread section joining the sidewalls, and without removing the tire from the wheel, said method comprising spreading an adhesive on the sidewall area to which the white sidewall is to be applied, applying a strip of white sidewall material to such area using the rim edge of the wheel as a guide, concentrically positioning on said wheel, a disc of a diameter corresponding to the outside diameter of the desired white sidewall, utilizing the rim of said disc as a guide, applying a bordering strip of black rubber to the wall of said tire, clamping said tire, while at low pressure, between a clamping plate and a heatable mold of annular shape having an inner diameter just sufficient to clear the rim of said wheel and raising the pressure in said tire, to lift the bead thereof from its normal position in the rim of the wheel to expose to said mold, a portion of the tire wall previously hidden behind the edge of the wheel, heating said mold to a vulcanizing temperature for a period sufficient to vulcanize said strips to said tire wall, reducing the tire pressure and clamping pressure to permit said bead to return to its normal position and carry with it behind the wheel edge, the contiguous portion of said vulcanized white sidewall strip, and then removing said wheel and mounted tire as an assembly.

4. The method of applying a white sidewall to a wheel-mounted tire having original sidewalls and a tread section joining the sidewalls, and without removing the tire from the wheel, said method comprising spreading an adhesive on the sidewall area to which the white sidewall is to be applied, applying a strip of white sidewall material to such area using the rim edge of the wheel as a guide, said strip having a width in excess of the white sidewall ultimately to be exposed, concentrically positioning on said wheel, a disc of a diameter such as to expose the excess width of said white sidewall strip, utilizing the rim of said disc as a guide, applying a bordering strip of black rubber to the wall of said tire in overlapping relationship to the exposed portion of said white sidewall strip, clamping said tire, while at low pressure, between a clamping plate and a heatable mold of annular shape having an inner diameter just sufficient to clear the rim of said wheel and raising the pressure in said tire, to lift the bead thereof from its normal position in the rim of the wheel to expose to said mold, a portion of the tire wall previously hidden behind the edge of the wheel, heating said mold to a vulcanizing temperature for a period sufficient to vulcanize said strips to said tire wall, reducing the tire pressure and clamping pressure to permit said bead to return to its normal position and carry with it behind the wheel edge, the contiguous portion of said vulcanized white sidewall strip, and then removing said wheel and mounted tire as an assembly.

5. Apparatus for applying a white sidewall to a wheel-mounted tire having original sidewalls and a tread section joining the sidewalls, said apparatus comprising a heatable annular mold for engagement with a layer of white sidewall material previously applied to an original sidewall of such tire, said mold having an inside diameter just sufficient to clear the outer edge of the rim of the wheel on which such tire is mounted, means for holding said mold concentric with such wheel while in contact with such previously applied white sidewall material, said means including a stem disposed axially of said annular mold, a centering cone on said stem adapted to fit into the hub opening of such wheel and engage the wheel, a clamping plate having a hole therethrough to permit said plate to fit over said stem and into engagement with the other sidewall of such tire, and means for drawing said mold and clamping plate into pressure engagement with such tire to effectively clamp such tire between them.

6. Apparatus for applying a white sidewall to a wheel-mounted tire having original sidewalls and a tread section joining the sidewalls, said apparatus comprising an adjustable tire encircling band for encircling such tire in peripheral contact with the tread area thereof, a heatable annular mold for engagement with a layer of white sidewall material previously applied to an original sidewall of such tire, said mold having an inside diameter just sufficient to clear the outer edge of the rim of the wheel on which such tire is mounted, means for holding said mold concentric with such wheel while in contact with such previously applied white sidewall material, said means including a stem disposed axially of said annular mold, a centering cone on said stem adapted to fit into the hub opening of such wheel and engage the wheel, a clamping plate having a hole therethrough to permit said plate to fit over said stem into engagement with the other sidewall of such tire, and means for drawing said mold and clamping plate into pressure engagement with such tire to effectively clamp such tire between them.

References Cited in the file of this patent

UNITED STATES PATENTS

| Number | Name | Date |
|---|---|---|
| 2,227,798 | Rihn et al. | Jan. 7, 1941 |
| 2,335,878 | Oren | Dec. 7, 1943 |
| 2,429,786 | Wright | Oct. 28, 1947 |
| 2,534,845 | Woods | Dec. 19, 1950 |
| 2,572,259 | Gottschall | Oct. 23, 1951 |
| 2,574,233 | Wolf | Nov. 6, 1951 |
| 2,761,489 | Kraft | Sept. 4, 1956 |